United States Patent [19]

Levinson

[11] Patent Number: 4,486,071
[45] Date of Patent: Dec. 4, 1984

[54] OPTICAL COUPLING DEVICE

[75] Inventor: Frank H. Levinson, Bethlehem, Pa.

[73] Assignee: AT&T Bell Laboratories, Murray Hill, N.J.

[21] Appl. No.: 396,118

[22] Filed: Jul. 7, 1982

[51] Int. Cl.³ .............................................. G02B 5/14
[52] U.S. Cl. .............................. 350/96.18; 350/96.16; 350/96.20
[58] Field of Search ............... 350/96.16, 96.18, 96.19, 350/96.20

[56] References Cited

U.S. PATENT DOCUMENTS

| | | | |
|---|---|---|---|
| 4,208,094 | 6/1980 | Tomlinson et al. | 350/96.19 X |
| 4,213,677 | 7/1980 | Sugimoto et al. | 350/96.18 |
| 4,239,330 | 12/1980 | Ashkin et al. | 350/96.18 |
| 4,304,460 | 12/1981 | Tanaka et al. | 350/96.16 |
| 4,355,864 | 10/1982 | Soref | 350/96.18 |
| 4,362,359 | 12/1982 | Dammann et al. | 350/96.18 X |
| 4,381,137 | 4/1983 | Berg et al. | 350/96.18 |

OTHER PUBLICATIONS

U.S. Patent Application of Levinson and Schweizer, Ser. No. 373,135, filed Apr. 29, 1982, and assigned to BTL, as discussed in the specification.

Primary Examiner—William L. Sikes
Assistant Examiner—Akm E. Ullah
Attorney, Agent, or Firm—Lester H. Birnbaum

[57] ABSTRACT

An optical coupling device for diverting light among different transmission elements. A plurality of transmission elements (11, 12, 13) are coupled to one surface (32) of a focusing element (10). Positioned near the opposite surface (32) are first and second at least partially reflecting elements (15 and 16). The first element (15) may be affixed to the end surface of the focusing element and covers only a portion thereof. The second element is positioned further from the end surface and at an angle to the first element. The area of the first element is chosen to produce a desired splitting ratio, and the angle between elements can be adjusted to maximize coupling efficiency between the transmission elements. The device can be used, for example, as a three port coupler, an asymmetric four port coupler, or a four port power divider.

17 Claims, 11 Drawing Figures

OPTICAL COUPLING DEVICE

BACKGROUND OF THE INVENTION

This invention relates to optical communications systems, and in particular to a device for diverting light among various optical transmission elements.

With the growth of optical communications systems, the need for coupling devices of various forms has arisen. In such systems, three and four port couplers could serve a variety of purposes. For example, in data communication transmission, bidirectional lines could be set up with the use of an efficient three port coupler where the bidirectional transmission line was at one port and the transmitter and receiver were coupled to a different one of the other ports. In systems where several terminals share a common central processing unit, it is desirable to provide a coupler which will permit each terminal to receive a portion of the light signal while allowing the bulk of the signal to be transmitted to other terminals. At the same time, the terminal should be able to transmit without interfering with its own receiver. Thus, an asymmetric four port coupler is needed. A further type of four port coupler, which can be thought of as a 1×3 power divider, may be useful in cable TV systems where it is desired that each station have the capability of transmitting back to the source of the signal. Thus, in such applications, a coupler is needed which will allow receiving a portion of the incoming signal at one port and transmitting a signal at another port in a direction opposed to the incoming signal while not interfering with the receiver at the other port.

Some proposals have been made for providing three and four port couplers. For example, U.S. Pat. No. 4,213,677 issued to Sugimoto suggests use of a beam splitter between two graded index of refraction lenses. Light from a fiber coupled to one surface of a lens is partially reflected by the beam splitter back to a fiber coupled to the same surface and partially transmitted to a fiber on the opposite surface of the other lens. Changing the reflectivity of the mirror adjusts the splitting ratio of the incoming light between the two output ports. While such a device performs acceptably, it is generally preferable to keep lens components to a minimum. Other types of three port couplers utilizing a single lens element have required some polishing or grinding which can cause fabrication difficulties.

A type of multiport coupler has been suggested in U.S. Pat. No. 4,304,460 issued to Tanaka. There, an array of fibers is coupled to one surface of a graded index of refraction lens and a rotatably mounted mirror positioned at an angle to the lens is provided at the other surface. Incoming light from one fiber is diverted to a selected one of the other fibers by a proper rotation of the mirror. Some multiplexing may also be accomplished by providing a filter element between the lens and the mirror. In most applications, it is believed that use of a rotating element adds undue complexity and cost to the coupler.

A particular design for an asymmetric four port coupler has been disclosed in U.S. patent application of Levinson and Schweizer, Ser. No. 373,135, filed Apr. 29, 1982 and assigned to the present assignee. There, at least partially reflecting elements are positioned between two graded index of refraction lenses and at an angle to each other. Two fibers on one surface of the lens opposite the reflecting elements provide the input and receiver ports, and two fibers on the opposite surface of the other lens provide the transmitter and output ports. The angle between the reflecting elements maximizes coupling between the input and output ports while isolating the transmitter and receiver ports. While such a device is generally advantageous, it is believed that use of a coupler with only one lens element for providing this function would cut down on cost and losses in optical transmission.

It is therefore an object of the invention to provide optical coupling devices which are economical and provide efficient coupling among transmission elements. It is a further object of the invention to provide such couplers where the ratio of light incident on the various elements may be conveniently altered to suit particular needs. Finally, it is an object of the invention to provide specific devices for three port coupling, asymmetric four port coupling and four port power dividing.

SUMMARY OF THE INVENTION

These and other objects are achieved in accordance with the invention which is an optical device for diverting light from one transmission element to another. The device comprises a light focusing element having two end surfaces, a plurality of light transmission elements coupled to one end surface, and a pair of at least partially reflecting elements in close proximity to the opposite end surface. The reflecting elements are disposed so that their optical axes are at an angle to each other, and at least one of the elements has an area which is a selected fraction of the area of the end surface.

BRIEF DESCRIPTION OF THE DRAWINGS

These and other features of the invention are delineated in detail in the following description. In the drawing.

It will be appreciated that for purposes of illustration, these figures are not necessarily drawn to scale.

DETAILED DESCRIPTION OF THE INVENTION

Figure 1:
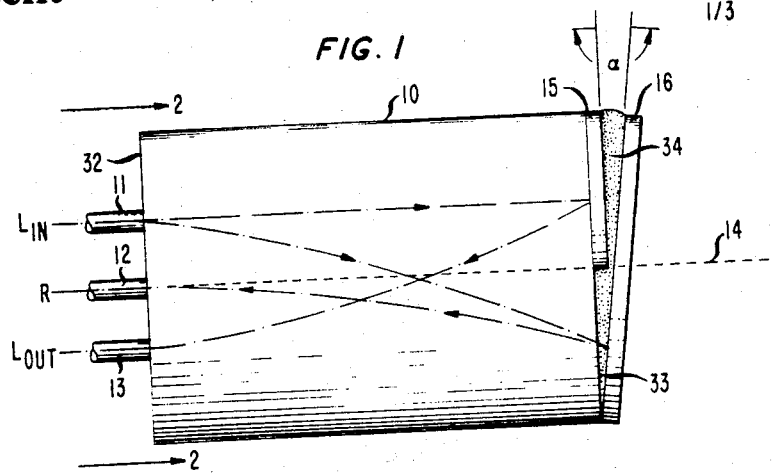
FIG. 1 is a partly schematic front view of a three port coupling device in accordance with the invention.
Figure 2:
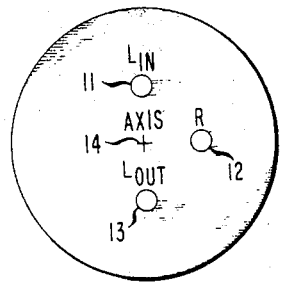
FIG. 2 is an end view of the device of FIG. 1.

One example of a three port coupler in accordance with the invention is illustrated in FIG. 1. The device includes a focusing element, 10, which in this case is a standard cylindrical graded index of refraction (grin) lens. The lens, in this and succeeding examples, had a ¼ pitch length (approximately 4.7 mm) and a diameter of 1.8 mm. Coupled to one end surface, 32, of the lens, was an array of three optical transmission elements, in this example optical fibers, 11, 12 and 13. The positioning of the fibers is illustrated in the end view of FIG. 2. It will be appreciated that distances between fibers are exaggerated and in actual practice the fiber claddings would probably be in contact. FIG. 2 does represent a preferred positioning of the fiber cores with respect to the optical axis, 14, of the grin lens. That is, the fibers are arranged in a triangular array with all fiber cores approximately equidistant from the axis. In actual practice, the precise positioning of the array will be adjusted as described later. In close proximity to the opposite end surface, 33, of the lens, a pair of at least partially reflecting elements, 15 and 16, were positioned. In this example, both elements were fully reflecting mirrors. Mirror 15 was deposited on the end surface in a semi-circular pattern so as to cover approximately one-half of the end surface (as, for example, shown in FIG. 10). Referring back to FIG. 1, mirror 16 was positioned so that its optical axis formed an angle $\alpha$ with the optical axis of mirror 15. The angle between the mirrors was fixed by an optical cement, 34, such as a UV curable cement sold by Norland Products, Inc. under the designation UV61. It will be understood from FIG. 1 that the angle $\alpha$ between the optical axes is the obtuse angle formed by considering both axes to be directed either toward or away from each other. Generally, the absolute value of the angle $\alpha$ will range from 170–179.5, and in this particular example was approximately 178.7°.

In operation, incoming light from fiber 11 spreads out due to the graded index of refraction and length of the lens so as to be incident on essentially the entire face 33. The arrows in FIG. 1 are intended to represent the approximate center of the portion of the light ray reflected by each mirror to illustrate the approximate directions of each light component. Thus, the portion of the light which is reflected by mirror 15 is incident on fiber 13 which in this example is coupled to the signal output ($L_{out}$). The portion of the light incident on the end surface portion not covered by mirror 15 is reflected by mirror 16. As a result of the angular position of mirror 16, the reflected light is incident on fiber 12 which in this example is coupled to a receiver port (R). Devices in this example typically had inserting losses of 0.7 dB for light from 11→13, 0.7 dB for light from 11→12, and 32 dB for light from 12→13.

One of the advantages of the invention is the fact that the splitting ratio of the incoming light among the other transmission elements can be varied according to particular needs by just varying the area of the mirror 15. Thus, although in this example the amount of light to fibers 12 and 13 was equal, more light could be directed to fiber 13 and correspondingly less light to 12 by increasing the area of mirror 15. Decreasing the area of mirror 15 would, of course, have an opposite effect.

Although FIG. 1 illustrates a typical three port coupler at a receiving portion of a system, the device could just as easily be used in the transmitting portion by coupling fiber 13 to the $L_{in}$ port, fiber 11 to the $L_{out}$ port and fiber 12 to the transmitter port. Such a device essentially operates in the reverse direction from the previous example. Thus, input light from fiber 13 would be reflected by mirror 15 onto fiber 11 and light from fiber 12 would be reflected by mirror 16 onto fiber 11.

Further, the device of FIG. 1 may also be used for coupling a bidirectional line to a transceiver. For example, the input-output port could be coupled to fiber 11, the transmitter port coupled to fiber 12 and the receiver port coupled to fiber 13. The incoming light on fiber 11 will be incident on both the transmitter and receiver ports, but this does no harm to the transmitter. The important characteristic of the device for such applications is the high degree of optical isolation between the transmitter port (fiber 12) and the receiver port (fiber 13). In this example, with a splitting ratio of 1:1, the isolation is typically approximately 32 dB. When the splitting ratio was increased to 1:20 (either increasing or decreasing the size of mirror 15), the isolation increased to approximately 40 dB.

In the fabrication of the device, a standard grin lens was utilized having the dimensions given previously. The mirror 15 was formed on surface 33 utilizing a metal mask in the area to remain uncovered and then depositing a mirror coating by a standard gold evaporation. An array of fibers, 11–13, contained within a standard capillary tube (not shown) having an as yet uncured cement at its end, was then brought into contact with end surface 32. While light was transmitted from fiber 11, the array was positioned to maximize light coupling between fibers 11 and 13, and then the cement was cured. The other mirror, 16, was positioned near the opposite end surface, 33, with the as yet uncured cement, 34, therebetween. The angle of the mirror was adjusted while light was transmitted from fiber, 11, to maximize light coupling between fibers, 11 and 12. The cement was then cured to fix the position of the mirror. Alignments were done using standard micro-positioning apparatus. Similar fabrication sequences can be employed for the other embodiments to be described.

Figure 3:
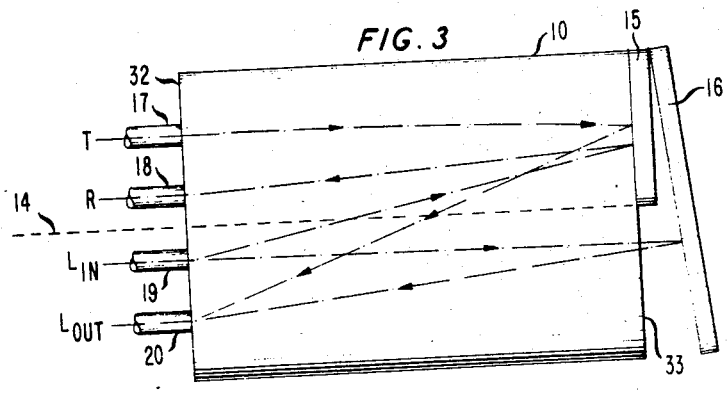
FIG. 3 is a partly schematic front view of a four port coupler in accordance with a further embodiment of the invention.

The invention may also be utilized as an asymmetric four port coupler as illustrated in FIG. 3, where elements corresponding to those of FIG. 1 are similarly numbered. The angular positioning of mirror 16 was the supplement of that in the previous example. Here, an array of four optical fibers, 17, 18, 19 and 20, was coupled to the end surface 32. Fiber 19 was coupled to the input port, $L_{in}$, fiber 20 to the output port, $L_{out}$, fiber 18 to the receiver port, R, and fiber 17 to the transmitter port, T. Again, the arrows indicate the general directions of light rays in the device and a detailed description of the operation is not believed necessary.

Figure 4:
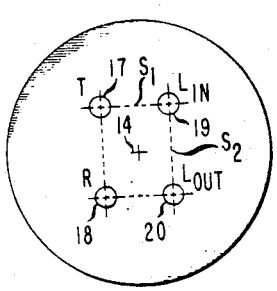
FIG. 4 is an end view of one embodiment of the device of FIG. 3.

Although the fibers are shown in a line in the plane of the drawing for illustrative purposes, the actual position of the fibers in a preferred embodiment is illustrated in FIG. 4. Again, distances are exaggerated. Each fiber was placed with its center at the corner of a rectangle having sides of approximately $S_1 = 228.6$ $\mu$m and $S_2 = 254$ $\mu$m. This can be done with standard alignment chips where the fibers rest in grooves formed in multilayers of a material such as silicon. The advantage of such a configuration for the fibers is that once the array is positioned with respect to mirror 15 to optimize coupling between fibers 19 and 18, then coupling between fibers 17 and 20 is automatically optimized as well. The only alignment then remaining is the coupling between fibers 19 and 20 which is optimized by adjusting the angle of mirror 16. To obtain this advantage in alignment, the fibers can be at the corners of a square or any other parallelogram with equal opposite sides.

A key factor in the operation of a device of this type is the degree of optical isolation between the transmitter and receiver ports. In this example, the insertion loss between fibers 17→18 (T→R) was greater than 43 dB. A loss of at least 25 dB is recommended. The loss for $L_{in}$→$L_{out}$ was approximately 4.5 dB, the loss for $L_{in}$→R was approximately 3.3 dB, and the loss for T→$L_{out}$ was approximately 3.0 dB.

Other types of four port couplers can be fabricated in accordance with the invention. For example, the device illustrated in FIG. 5 utilizes a second focusing element, in this example another grin lens 35 identical to the first grin lens, in close proximity to the end surface of the first focusing element. Further, a beam splitting element, 21, was substituted for the fully reflecting mirror 16. In this example, the beam splitting element, 21, was a standard multilayer dielectric film which was deposited on to one end surface, 36, of the second grin lens. An array of three fibers, 22, 23, and 24 was coupled to the end surface, 32, of grin lens, 10, and fiber 25 was coupled to the opposite end surface, 37, of the second grin lens 35. Thus, light transmitted by fiber 22 from the $L_{in}$ port and incident on element, 21, was partially transmitted to fiber 25 ($L_{out}$) and partially reflected to fiber 24 to one of the output taps (out$_1$). The angle between the optical axes of elements 15 and 21 was adjusted to optimize coupling to that output. In this example, the angle was approximately 178.7°. The portion of the light incident on mirror 15 was reflected to fiber 23 to the other output tap (out$_2$). In this example, the ratio of coupling to fibers 23, 24 and 25 was 2:1:1, but the light input can be divided among three outputs by any desired ratio depending upon the area of mirror 15 and the reflectivity of beam splitter 21. One of the key advantages of this type of coupler is the fact that either of the output taps may be used as a transmitter port. Here, however, the light from such a transmitter would be incident upon the $L_{in}$ port so that information could be sent back to the source.

Figure 6:
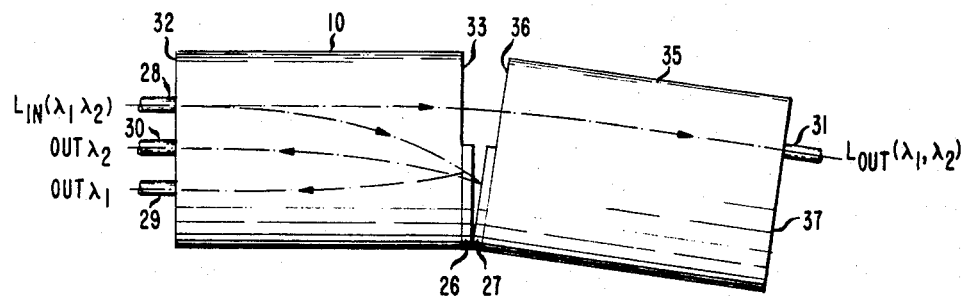
FIG. 6 is a partly schematic front view of a four port power divider in accordance with yet another embodiment of the invention.

Another form of such a four port coupler is illustrated in FIG. 6. Here, a filter element, 26, and a mirror, 27, were positioned in close proximity to one end, 33, of the first grin lens 10. Again, an array of three fibers, 28, 29 and 30, was coupled at the opposite end, 32, of the first grin lens, and a fiber, 31, was coupled to the opposite end, 37, of the other grin lens. In this example, filter, 26, was deposited directly on end, 33, of lens, 10, and mirror, 27, was deposited directly on end, 36, of lens, 35. (The optical cement between the two end faces, 33 and 36, used to maintain the angle between filters is omitted from the figures for the sake of clarity). Here, the incoming signal from fiber, 28, has two wavelength components, $\lambda_1$ and $\lambda_2$. The portion of the signal not incident on the filter or mirror (which covers only one-half of the end faces in this example) is transmitted essentially unaffected to fiber 31. The bandpass of the filter is chosen so that of the remaining portion of the input, the $\lambda_1$ component is reflected by filter, 26, onto fiber, 29, and the $\lambda_2$ component is reflected by mirror, 27, onto fiber, 30, the latter incidence resulting from the angle of mirror, 27. If the operation of the device in FIG. 6 is changed slightly so that one wavelength component is transmitted from $L_{in}$→$L_{out}$ and the other wavelength component is transmitted from $L_{out}$→$L_{in}$, the customer can transmit back to the source on a wavelength different from the one received so that cross talk is minimized. For example, if the $\lambda_1$ component is being transferred from $L_{in}$→$L_{out}$, fiber 30 can be coupled to the transmitter port while fiber 29 remains coupled to a receiver port.

Figure 7:
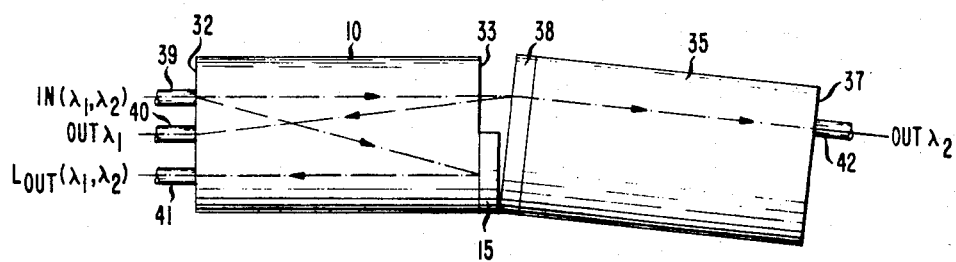
FIG. 7 is a partly schematic front view of a four port power divider in accordance with a still further embodiment of the invention.

An alternative design for the device of FIG. 6 is illustrated in FIG. 7. Here, the device utilizes a combination of partial area mirror, 15, end filter element, 38, in close proximity to the end surface, 33, of the first lens 10. The array of fibers, 39, 40, 41 is coupled at the opposite end surface, 32, and the angle between the optical axes of elements 15 and 38 is adjusted so that when input light of wavelength components $\lambda_1$ and $\lambda_2$ is incident on filter 38, the $\lambda_1$ component will be reflected onto fiber 40, and the $\lambda_2$ component will be transmitted through the second lens, 35, onto fiber, 42, which is coupled to the opposite surface, 37. The portion of input light incident on mirror 15 (both $\lambda_1$ and $\lambda_2$ components) is incident on fiber, 41.

Figure 8:
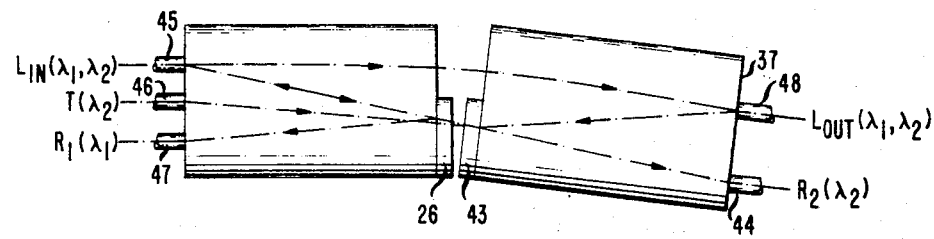
FIG. 8 is a partly schematic front view of a five port coupler in accordance with a further embodiment of the invention.

As illustrated in FIG. 8, the device in accordance with the invention can include more than four ports. This device is similar to the device illustrated in FIG. 6 except for the addition of fiber, 44, at the opposite end surface, 37, of the second focusing element. The device can be considered a combination of an asymmetric four coupler and a multiplexing four port coupler. In operation, light of wavelength components $\lambda_1$ or $\lambda_2$ can be transmitted in either direction between fibers 45 and 48 as in the case of FIG. 6. (In this example, it is assumed light of wavelength $\lambda_1$ is transmitted from 45 to 48 and light of wavelength $\lambda_2$ is transmitted from 48 to 45.) Light of wavelength $\lambda_2$ can be transmitted from fiber, 46, reflected by mirror, 43, onto the fiber, 45, and thereby be transmitted back to the source. Light of the other wavelength component, $\lambda_1$, can be received by the other fiber, 47, on end surface, 32, due to reflection from filter, 26. By the same token, light of the $\lambda_2$ component being transmitted upstream from fiber, 48, which is incident on mirror, 43, is reflected back onto fiber, 44, to the other receiver port $R_2$. Thus, the device allows receiving a signal from the source ($L_{in}$) at port $R_1$ or from somewhere farther downstream ($L_{out}$) at port $R_2$ and permits transmitting a signal back to the source from port T. Here again the ports T($\lambda_2$) and $R_2$($\lambda_2$) are highly isolated by greater than 30 dB.

Figure 5:
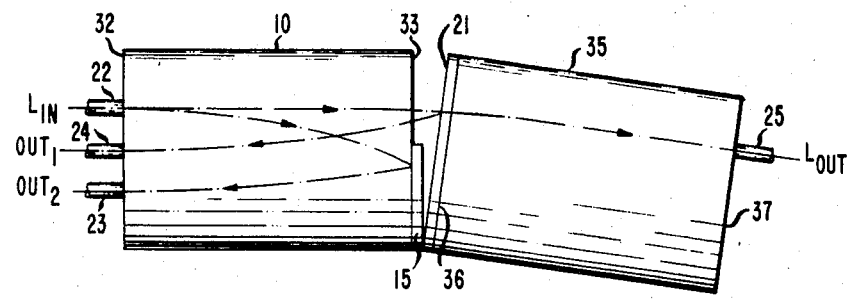
FIG. 5 is a partly schematic front view of a four port power divider in accordance with a further embodiment of the invention.
Figure 9:
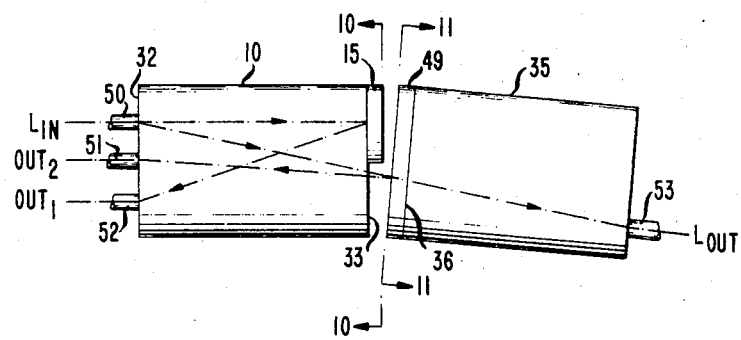
FIG. 9 is a partly schematic front view of a four port power divider in accordance with another embodiment of the invention.
Figure 10:
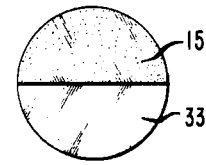
FIG. 10 is an end view of one portion of the device shown in FIG. 9.
Figure 11:
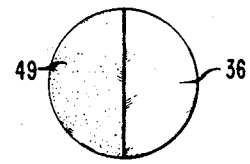
FIG. 11 is an end view of another portion of the device shown in FIG. 9.

Finally, as illustrated in FIGS. 9, 10 and 11, a power divider such as that shown in FIG. 5 need not require use of a beam splitter 21. Rather, a combination of partial area mirrors, 15 and 49, formed on end surfaces, 33 and 36, of lenses, 10 and 35, respectively, can be utilized to achieve the same function with a proper choice of the area covered by each mirror. Thus, with the half mirrors used in FIG. 9, the position of mirror, 49, can be rotated 90° with respect to the position of mirror 15 as shown in the end views of FIGS. 10 and 11. This leaves one quadrant of the grin lens end surfaces, 33 and 36, uncovered so that a portion of light from fiber, 50, can be transmitted through both lenses to fiber, 53. The portion of light incident on mirror, 15, will be reflected onto fiber, 52, and the portion of light incident on mirror, 49, will be incident on fiber, 51. As in previous examples, either fiber, 51 or 52, can be used to transmit a signal back to the source ($L_{in}$).

Several additional modifications of the invention are possible. For example, the reflecting elements could be formed on the end faces of the focusing elements by photolithographic etching as well as by masked deposition. Further, although the fibers are all shown as being the same sizes, fibers of varying diameters could be used on a single device depending on particular needs. It should also be realized that the term "optical transmission element" as used in this application is intended to include any component used in optical transmission, and could be a light source or detector coupled directly to an end surface of one of the focusing elements.

Various additional modifications of the invention will become apparent to those skilled in the art. All such variations which basically rely on the teachings through which the invention has advanced the art are properly considered within the spirit and scope of the invention.

What is claimed is:

1. An optical device for diverting light from one transmission element to another comprising:
    a light focusing element having two end surfaces;
    a plurality of light transmission elements coupled to one end surface; and
    a pair of at least partially reflecting elements in close proximity to the opposite end surface and disposed so that their optical axes are at an angle to each other, at least one of said reflecting elements having an area which covers a continuous portion of the area of the said opposite end surface contiguous with an edge of said surface and which is a selected fraction of the area of the end surface so that light from at least one light transmission element can pass through said opposite end surface without being incident on the said reflecting element.

2. The device according to claim 1 wherein the focusing element comprises a cylindrical graded index of refraction lens.

3. The device according to claim 1 wherein the transmission elements comprise optical fibers.

4. The device according to claim 1 wherein the absolute value of the angle between the optical axes of the reflecting elements lies within the range 170–179.5.

5. The device according to claim 1 wherein at least three transmission elements are coupled to said one end surface so that the portions of light from one transmission element which are incident on different reflecting elements will be reflected primarily onto a different one of the other transmission elements.

6. The device according to claim 5 wherein the transmission elements are arranged so that their centers are at the corners of a triangle and are approximately equidistant from the axis of the focusing element.

7. The device according to claim 1 wherein at least four transmission elements are coupled to said one end surface so that the portions of light from a first transmission element which are incident on different reflecting elements are reflected primarily onto a different one of the second and third transmission elements and light from the fourth transmission element is reflected onto the second transmission element while being optically isolated from the third transmission element.

8. The device according to claim 7 wherein the transmission elements are arranged so that their centers are at the corners of a parallelogram with equal opposite sides.

9. The device according to claim 7 wherein the optical isolation between the third and fourth transmission element is at least 25 dB.

10. The device according to claim 1 wherein only one light focusing element is included in the device.

11. The device according to claim 1 further comprising a second light focusing element having two end surfaces with one end surface positioned in close proximity to the reflecting elements and at least one transmission element coupled to the opposite surface of the second focusing element.

12. The device according to claim 11 wherein a first one of the transmission elements coupled to the end surface of the first focusing element is adapted to transmit light of more than one wavelength component and at least one of the reflecting elements is a filter which reflects one of the components and transmits the other components.

13. The device according to claim 12 wherein a second one of the transmission elements coupled to the end surface of the first focusing element is adapted to transmit light of one of said wavelength components back to the first transmission element.

14. The device according to claim 11 wherein the area of each of said reflecting elements is a selected fraction of the area of a respective end surface of one of the focusing elements, and the reflecting elements are oriented so that there is at least a portion of both end surfaces through which light can pass from a transmission element coupled to the first focusing element to a transmission element coupled to the second focusing element without being incident on one of the reflecting elements.

15. An optical device for diverting light from one optical fiber to another comprising:
    a cylindrical graded index of refraction lens having two ends surfaces;
    a plurality of optical fibers coupled to one end surface; and
    a pair of at least partially reflecting elements in close proximity to the opposite end surface and disposed so that their optical axes are at an angle having an absolute value in the range 170°–179.5°, where at least one of said elements is formed on the said opposite end surface and covers a continuous area which is contiguous with an edge of the said opposite end surface and which is a selected fraction of the area of the said opposite surface so that light from at least one of said optical fibers can pass through said opposite end surface without being incident on the said reflecting element.

16. The device according to claim 15 wherein said at least one of the reflecting elements has a semicircular area so as to cover approximately one-half of the area of said opposite end surface.

17. An optical device for diverting light from one transmission element to another comprising:
    a light focusing element having two end surfaces;
    at least four transmission elements coupled to one end surface; and
    a pair of at least partially reflecting elements in close proximity to the opposite end surface and disposed so that their optical axes are at an angle to each other, at least one of the reflecting elements having an area which covers a continuous portion of the area of the said opposite end surface and which is a selected fraction of the area of said opposite end surface so that light from at least one transmission element can pass through said opposite end surface without being incident on the said reflecting element,
    the transmission elements being placed with respect to the reflecting elements so that the portions of light from a first transmission element which are incident on different reflecting elements are reflected primarily onto a different one of the second and third transmission elements and light from the fourth transmission element is reflected onto the second transmission element while being optically isolated from the third transmission element.

* * * * *